US010535854B2

(12) United States Patent
Ohkubo et al.

(10) Patent No.: US 10,535,854 B2
(45) Date of Patent: Jan. 14, 2020

(54) BINDER COMPOSITION FOR NON-AQUEOUS SECONDARY BATTERY, COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Yuuki Ohkubo, Tokyo (JP); Hiromi Takamatsu, Tokyo (JP); Yujiro Toyoda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 17 days.

(21) Appl. No.: 15/750,949

(22) PCT Filed: Aug. 18, 2016

(86) PCT No.: PCT/JP2016/003768
§ 371 (c)(1),
(2) Date: Feb. 7, 2018

(87) PCT Pub. No.: WO2017/029813
PCT Pub. Date: Feb. 23, 2017

(65) Prior Publication Data
US 2018/0233728 A1 Aug. 16, 2018

(30) Foreign Application Priority Data

Aug. 20, 2015 (JP) ................. 2015-162934

(51) Int. Cl.
H01M 2/16 (2006.01)
C08F 228/02 (2006.01)
C08L 41/00 (2006.01)
H01M 4/131 (2010.01)
H01M 4/62 (2006.01)
C08F 220/14 (2006.01)
C08F 220/46 (2006.01)
C08L 33/10 (2006.01)
C08L 33/20 (2006.01)
H01M 10/0525 (2010.01)
H01M 4/36 (2006.01)

(52) U.S. Cl.
CPC ......... H01M 2/1653 (2013.01); C08F 220/14 (2013.01); C08F 220/46 (2013.01); C08F 228/02 (2013.01); C08L 33/10 (2013.01); C08L 33/20 (2013.01); C08L 41/00 (2013.01); H01M 2/166 (2013.01); H01M 2/1686 (2013.01); H01M 4/131 (2013.01); H01M 4/622 (2013.01); H01M 10/0525 (2013.01); C08F 2800/00 (2013.01); C08L 2201/50 (2013.01); C08L 2205/025 (2013.01); H01M 2/1673 (2013.01); H01M 4/366 (2013.01)

(58) Field of Classification Search
CPC ..................................................... C08F 220/46
See application file for complete search history.

(56) References Cited

U.S. PATENT DOCUMENTS

| 2,837,500 | A | * | 6/1958 | Andres | ................ | C08F 220/46 |
| | | | | | | 260/DIG. 14 |
| 3,049,512 | A | * | 8/1962 | Fournet | ................ | C07C 309/00 |
| | | | | | | 526/287 |
| 3,167,574 | A | | 1/1965 | Witte | | |
| 4,058,509 | A | * | 11/1977 | Menand | ................ | C08F 20/42 |
| | | | | | | 526/213 |
| 2013/0273421 | A1 | | 10/2013 | Matsumura et al. | | |
| 2016/0126553 | A1 | | 5/2016 | Murase et al. | | |
| 2019/0085109 | A1 | * | 3/2019 | Goto | ..................... | H01M 4/139 |

FOREIGN PATENT DOCUMENTS

| GB | 1463175 A | 2/1977 |
| JP | 2013145763 A | 7/2013 |
| WO | 2012046843 A1 | 4/2012 |
| WO | 2014051067 A1 | 4/2014 |
| WO | 2014185072 A1 | 11/2014 |
| WO | 2014196436 A1 | 12/2014 |
| WO | WO 2017/170281 | * 10/2017 |

OTHER PUBLICATIONS

Feb. 11, 2019, the Extended European Search Report issued by the European Patent Office in the corresponding European Patent Application No. 16836806.6.
Vaibhavee Bhadja et al., Poly(acrylonitrile-co-styrene sodium sulfonate-co-n-butyl acrylate) terpolymer based cation exchange membrane for water desalination via electrodialysis, RSC Advances, 2015, vol. 5, Issue 50, pp. 40026-40035.
Feb. 20, 2018, International Preliminary Report on Patentability issued in the International Patent Application No. PCT/JP2016/003768.
Oct. 4, 2016, International Search Report issued in the International Patent Application No. PCT/JP2016/003768.

* cited by examiner

Primary Examiner — Jeffrey C Mullis
(74) Attorney, Agent, or Firm — Kenja IP Law PC

(57) ABSTRACT

Provided is a binder composition for a non-aqueous secondary battery that enables formation of a functional layer and an electrode mixed material layer having high transition metal capturing ability. The binder composition for a non-aqueous secondary battery contains a water-soluble polymer and water. The water-soluble polymer includes a sulfonate group-containing monomer unit in a proportion of at least 10 mass % and not more than 50 mass % and a (meth)acrylonitrile monomer unit in a proportion of 20 mass % or more.

7 Claims, No Drawings

BINDER COMPOSITION FOR NON-AQUEOUS SECONDARY BATTERY, COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

This disclosure relates to a binder composition for a non-aqueous secondary battery, a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery generally includes battery members such as electrodes (positive and negative electrodes) including electrode mixed material layers and a separator that isolates the positive electrode and the negative electrode from one another and prevents short circuiting between the positive and negative electrodes. In recent years, it has become common to use battery members including functional layers such as a porous membrane layer for improving heat resistance and strength or an adhesive layer for improving adhesiveness between battery members.

A binder that displays binding capacity may be used with an objective of binding components in a battery member such as described above, binding battery members to one another, or the like. Moreover, attempts have been made to improve binders used in the formation of electrode mixed material layers and functional layers with the aim of further improving secondary battery performance (for example, refer to PTL 1 and 2).

PTL 1 proposes a technique for inhibiting gas generation caused by halide ions or the like in an electrolysis solution by forming a porous membrane layer using, as a binder, a water-soluble polymer including an acid group-containing monomer unit in a proportion of 20 wt % to 80 wt % and an amide monomer unit in a proportion of 0.1 wt % to 10 wt %.

PTL 2 proposes a technique for inhibiting the formation of aggregates and improving electrical characteristics of a secondary battery by forming a positive electrode mixed material layer using a binder composition for a positive electrode containing: a binder that includes an acidic group-containing ethylenically unsaturated monomer unit in a proportion of 10 mass % to 35 mass % and has a specific weight average molecular weight; an organic dispersion medium; and a specific number of equivalents of lithium relative to acidic groups in the binder.

CITATION LIST

Patent Literature

PTL 1: WO 2014/196436 A1
PTL 2: WO 2014/185072 A1

SUMMARY

Technical Problem

In recent years, electrode mixed material layers for positive electrodes (positive electrode mixed material layers) that contain transition metal-containing positive electrode active materials (for example, $LiCoO_2$, $LiNiO_2$, and lithium-containing composite oxide of Co—Ni—Mn) have been used as positive electrode mixed material layers in secondary batteries from viewpoints such as increasing secondary battery capacity. However, in a secondary battery in which a transition metal-containing positive electrode active material is used, the transition metal (for example, cobalt, nickel, or manganese) in the positive electrode active material may elute into electrolysis solution as transition metal ions due to side-reactions or the like associated with use of the secondary battery. There is a concern that transition metal eluting into the electrolysis solution from the positive electrode may deposit on the negative electrode and have a negative impact on battery characteristics of the secondary battery, such as cycle characteristics.

Although much attention has conventionally been focused on techniques for improving secondary battery performance by improving physical properties of secondary battery members themselves, there has been insufficient investigation into the problem of transition metal elution described above. Therefore, there is demand for the provision of a technique that, in a secondary battery in which a transition metal-containing positive electrode active material is used, enables the capture of transition metal ions that elute from the positive electrode active material before these ions migrate to the negative electrode, or upon these ions reaching the negative electrode, to prevent transition metal deposition on the negative electrode.

Solution to Problem

The inventors conducted diligent investigation with the aim of providing a technique for capturing transition metal ions that elute into an electrolysis solution from a positive electrode active material. Through this investigation, the inventors conceived an idea of capturing transition metal ions that elute into an electrolysis solution in a secondary battery from a positive electrode active material by providing an electrode mixed material layer of an electrode or a functional layer of an electrode or separator with transition metal ion capturing functionality. The inventors conducted further studies and discovered that an electrode mixed material layer and a functional layer that display excellent transition metal capturing ability can be formed using a binder composition that contains, dissolved in water, a water-soluble polymer including a sulfonate group-containing monomer unit and a (meth)acrylonitrile monomer unit in specific proportions. The present disclosure was completed based on this discovery.

Specifically, this disclosure aims to advantageously solve the problems set forth above by disclosing a binder composition for a non-aqueous secondary battery comprising a water-soluble polymer and water, wherein the water-soluble polymer includes a sulfonate group-containing monomer unit in a proportion of at least 10 mass % and not more than 50 mass % and a (meth)acrylonitrile monomer unit in a proportion of 20 mass % or more. By using a binder composition that contains, dissolved in water, a water-soluble polymer including a sulfonate group-containing monomer unit and a (meth)acrylonitrile monomer unit in specific proportions as set forth above, an electrode mixed material layer or functional layer can be provided with high transition metal capturing ability.

The phrase "includes a monomer unit" as used herein means that "a polymer obtained with the monomer includes a repeating unit derived from the monomer". Moreover, in the present disclosure, "(meth)acrylonitrile" is used to indicate "acrylonitrile" and/or "methacrylonitrile". Furthermore, when a polymer is referred to as "water-soluble" in the present disclosure, this means that when 0.5 g of the polymer is dissolved in 100 g of water at 25° C., insoluble content is less than 0.5 mass %.

In the presently disclosed binder composition for a non-aqueous secondary battery, the water-soluble polymer preferably has a degree of swelling in non-aqueous electrolysis solution of at least a factor of 2 and not more than a factor of 5. Through use of a water-soluble polymer having a degree of swelling in non-aqueous electrolysis solution of at least a factor of 2 and not more than a factor of 5, transition metal capturing ability of an electrode mixed material layer or functional layer obtained using the binder composition can be further increased while also improving adhesiveness after immersion in electrolysis solution and secondary battery cycle characteristics.

Note that the "degree of swelling in non-aqueous electrolysis solution" of a water-soluble polymer in the present disclosure can be determined as a value (factor) calculated by dividing the weight of a film formed from the water-soluble polymer (binder film) after immersion in a specific non-aqueous electrolysis solution under specific conditions by the weight of the film prior to immersion.

The presently disclosed binder composition for a non-aqueous secondary battery preferably further comprises a particulate polymer. By using a binder composition that contains a particulate polymer in addition to the water-soluble polymer set forth above, a functional layer and an electrode mixed material layer can be provided with flexibility, and adhesiveness of these layers both before and after immersion in electrolysis solution can be ensured.

Moreover, this disclosure aims to advantageously solve the problems set forth above by disclosing a composition for a non-aqueous secondary battery functional layer comprising any one of the binder compositions for a non-aqueous secondary battery set forth above and non-conductive particles. A functional layer that is obtained using a composition for a functional layer containing any one of the binder compositions set forth above and non-conductive particles can favorably function as a porous membrane layer having excellent heat resistance and strength while also displaying high transition metal capturing ability.

In the presently disclosed composition for a non-aqueous secondary battery functional layer, the water-soluble polymer is preferably contained in a proportion of at least 1 part by mass and not more than 10 parts by mass per 100 parts by mass of the non-conductive particles. By setting a compounding ratio of the non-conductive particles and the water-soluble polymer in the composition for a functional layer within the range set forth above, transition metal capturing ability of a functional layer can be further increased while also improving heat contraction resistance and a Gurley value of the functional layer, and increasing secondary battery cycle characteristics and rate characteristics.

Furthermore, this disclosure aims to advantageously solve the problems set forth above by disclosing a functional layer for a non-aqueous secondary battery formed using any one of the compositions for a non-aqueous secondary battery functional layer set forth above. A functional layer for a non-aqueous secondary battery that is formed using any one of the compositions for a non-aqueous secondary battery functional layer set forth above has high transition metal capturing ability and favorably functions as a porous membrane layer having excellent heat resistance and strength.

Also, this disclosure aims to advantageously solve the problems set forth above by disclosing a non-aqueous secondary battery comprising the functional layer for a non-aqueous secondary battery set forth above. A non-aqueous secondary battery including the functional layer for a non-aqueous secondary battery set forth above has excellent battery characteristics such as cycle characteristics.

Advantageous Effect

According to this disclosure, it is possible to provide a binder composition for a non-aqueous secondary battery that enables formation of a functional layer and an electrode mixed material layer having high transition metal capturing ability.

Moreover, according to this disclosure, it is possible to provide a composition for a non-aqueous secondary battery functional layer that enables formation of a functional layer having high transition metal capturing ability.

Furthermore, according to this disclosure, it is possible to provide a functional layer for a non-aqueous secondary battery having high transition metal capturing ability and a non-aqueous secondary battery that includes this functional layer for a non-aqueous secondary battery and has excellent battery characteristics such as cycle characteristics.

DETAILED DESCRIPTION

The following provides a detailed description of embodiments of the present disclosure.

The presently disclosed binder composition for a non-aqueous secondary battery is used in formation of an electrode mixed material layer that is formed on a current collector of an electrode or in formation of a functional layer for a non-aqueous secondary battery that is formed on the electrode mixed material layer (i.e., on an electrode substrate) or a separator substrate. The presently disclosed composition for a non-aqueous secondary battery functional layer contains the presently disclosed binder composition for a non-aqueous secondary battery and is used as a material in production of the presently disclosed functional layer for a non-aqueous secondary battery. The presently disclosed functional layer for a non-aqueous secondary battery is produced using the presently disclosed composition for a non-aqueous secondary battery functional layer and may, for example, constitute part of a separator or an electrode. The presently disclosed non-aqueous secondary battery includes the presently disclosed functional layer for a non-aqueous secondary battery.

(Binder Composition for Non-Aqueous Secondary Battery)

The presently disclosed binder composition for a non-aqueous secondary battery is a composition in which a water-soluble polymer is dissolved in water. One feature of the presently disclosed binder composition for a non-aqueous secondary battery is that the water-soluble polymer includes a sulfonate group-containing monomer unit in a proportion of at least 10 mass % and not more than 50 mass % and a (meth)acrylonitrile monomer unit in a proportion of 20 mass % or more.

By using the presently disclosed binder composition to form an electrode mixed material layer or a functional layer, these layers can be caused to display high transition metal capturing ability. The water-soluble polymer in the presently disclosed binder composition also has excellent binding capacity. Therefore, the presently disclosed binder composition can favorably be used as either a binder composition for an electrode or a binder composition for a functional layer. On the other hand, from a viewpoint of reliably capturing transition metal ions that elute from a positive electrode before these transition metal ions reach a negative electrode, the presently disclosed binder composition is preferably used to form a positive electrode mixed material layer or a functional layer, and is more preferably used to form a functional layer. In other words, the presently disclosed binder composition is preferably a binder composition for a positive electrode or a binder composition for a functional layer, and is more preferably a binder composition for a functional layer. The following provides a description of the presently disclosed binder composition through an example in which the binder composition is used to form a functional layer.

<Water-Soluble Polymer>

The water-soluble polymer includes a sulfonate group-containing monomer unit in a proportion of at least 10 mass % and not more than 50 mass % and a (meth)acrylonitrile monomer unit in a proportion of 20 mass % or more, and may optionally include monomer units other than the sulfonate group-containing monomer unit and the (meth)acrylonitrile monomer unit. The transition metal capturing ability of a functional layer is improved as a result of the water-soluble polymer having a monomer composition such as set forth above. In addition, a functional layer containing the water-soluble polymer having this monomer composition has excellent adhesiveness before immersion in electrolysis solution, which sufficiently inhibits dusting, and the functional layer can provide a battery member (particularly a separator) with excellent heat contraction resistance. Moreover, since the water-soluble polymer dissolves in an aqueous binder composition or an aqueous composition for a functional layer, the water-soluble polymer differs from a water-insoluble polymer that is normally present in a particulate form in an aqueous medium, and the molecular chain of the water-soluble polymer is thought to be sufficiently spread out in these compositions. This is presumed to ensure sufficient specific surface area of the water-soluble polymer when the functional layer is incorporated into a secondary battery, and thereby enable the resultant functional layer to display sufficient transition metal capturing ability.

[Sulfonate Group-Containing Monomer Unit]

Examples of sulfonate group-containing monomers that can be used to form the sulfonate group-containing monomer unit include styrene sulfonic acid, vinyl sulfonic acid, methyl vinyl sulfonic acid, (meth)allyl sulfonic acid, (meth)acrylic acid-2-ethyl sulfonate, 2-acrylamido-2-methylpropane sulfonic acid, 3-allyloxy-2-hydroxypropane sulfonic acid, and salts thereof (for example, lithium salts and sodium salts). One of these sulfonate group-containing monomers may be used individually, or two or more of these sulfonate group-containing monomers may be used in combination. Of these sulfonate group-containing monomers, styrene sulfonic acid, 2-acrylamido-2-methylpropane sulfonic acid, and salts thereof are preferable, lithium styrenesulfonate and sodium styrenesulfonate are more preferable, and lithium styrenesulfonate is even more preferable from a viewpoint of improving secondary battery cycle characteristics.

In the present disclosure, "(meth)allyl" is used to indicate "allyl" and/or "methallyl", and "(meth)acryl" is used to indicate "acryl" and/or "(meth)acryl".

The proportion constituted by the sulfonate group-containing monomer unit among all monomer units included in the water-soluble polymer is required to be at least 10 mass % and not more than 50 mass %, is preferably 15 mass % or more, more preferably 20 mass % or more, and even more preferably 30 mass % or more, and is preferably 45 mass % or less, and more preferably 40 mass % or less. If the percentage content of the sulfonate group-containing monomer unit is less than 10 mass %, sufficient transition metal capturing ability of a functional layer cannot be ensured, and secondary battery cycle characteristics decrease. On the other hand, if the percentage content of the sulfonate group-containing monomer unit is more than 50 mass %, this causes aggregation of non-conductive particles in a composition for a functional layer and reduces adhesiveness of a functional layer before immersion in electrolysis solution.

[(Meth)Acrylonitrile Monomer Unit]

Examples of (meth)acrylonitrile monomers that can be used to form the (meth)acrylonitrile monomer unit include acrylonitrile and methacrylonitrile. One of these (meth)acrylonitrile monomers may be used individually, or two or more of these (meth)acrylonitrile monomers may be used in combination. Of these (meth)acrylonitrile monomers, acrylonitrile is preferable from a viewpoint of raising transition metal capturing ability of a functional layer and improving secondary battery cycle characteristics.

The proportion constituted by the (meth)acrylonitrile monomer unit among all monomer units included in the water-soluble polymer is required to be 20 mass % or more, is preferably 25 mass % or more, and more preferably 30 mass % or more, and is preferably 50 mass % or less, more preferably 40 mass % or less, and even more preferably 35 mass % or less. If the percentage content of the (meth)acrylonitrile monomer unit is less than 20 mass %, sufficient transition metal capturing ability of a functional layer cannot be ensured, and secondary battery cycle characteristics decrease. Moreover, there may be loss of heat contraction resistance of a battery member (particularly a separator) including the functional layer, which is troublesome particularly in a case in which the functional layer is used as a porous membrane layer. On the other hand, when the percentage content of the (meth)acrylonitrile monomer unit is 50 mass % or less, adhesiveness of a functional layer before immersion in electrolysis solution can be ensured.

[Other Monomer Units]

Examples of monomer units other than the sulfonate group-containing monomer unit and the (meth)acrylonitrile monomer unit include, but are not specifically limited to, (meth)acrylic acid ester monomer units and acid group-containing monomer units (excluding those containing a sulfonate group). One of these other monomer units may be used individually, or two or more of these other monomer units may be used in combination.

[[(Meth)Acrylic Acid Ester Monomer Unit]]

Examples of (meth)acrylic acid ester monomers that can be used to form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. Of these examples, (meth)acrylic acid alkyl esters in which the alkyl group bonded to the non-carbonyl oxygen atom has a carbon number of at least 1 and not more than 10 are preferable, and (meth)acrylic acid alkyl esters for which this carbon number is at least 1 and not more than 7 are more preferable from a viewpoint of increasing adhesiveness of a functional layer before immersion in electrolysis solution while ensuring water-solubility of the resultant polymer. Specifically, butyl acrylate (n-butyl acrylate, t-butyl acrylate, and isobutyl acrylate), ethyl acrylate, and 2-ethylhexyl acrylate are preferable, butyl acrylate and ethyl acrylate are more preferable, and butyl acrylate is even more preferable.

The proportion constituted by the (meth)acrylic acid ester monomer unit among all monomer units included in the water-soluble polymer is preferably 15 mass % or more, more preferably 20 mass % or more, even more preferably 25 mass % or more, and particularly preferably 30 mass % or more. When the percentage content of the (meth)acrylic acid ester monomer unit is 15 mass % or more, adhesiveness of a functional layer before immersion in electrolysis solution can be increased. Note that the percentage content of the (meth)acrylic acid ester monomer unit is required to be 70 mass % or less, and is preferably 65 mass % or less.

[[Acid Group-Containing Monomer Unit]]

No specific limitations are placed on acid group-containing monomers that can be used to form an acid group-containing monomer unit other than being a monomer that contains an acid group other than a sulfonate group, and examples thereof include a carboxylic acid group-containing monomer, a phosphate group-containing monomer, and a hydroxy group-containing monomer.

Examples of carboxylic acid group-containing monomers include monocarboxylic acids, dicarboxylic acids, and salts thereof (for example, sodium salts and lithium salts). Examples of monocarboxylic acids include acrylic acid, methacrylic acid, and crotonic acid. Examples of dicarboxylic acids include maleic acid, fumaric acid, and itaconic acid.

Examples of phosphate group-containing monomers include 2-(meth)acryloyloxyethyl phosphate, methyl-2-(meth)acryloyloxyethyl phosphate, ethyl-(meth)acryloyloxyethyl phosphate, and salts thereof (for example, sodium salts and lithium salts). In the present disclosure, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, 2-hydroxypropyl methacrylate, and salts thereof (for example, sodium salts and lithium salts).

Of these acid group-containing monomers, carboxylic acid group-containing monomers are preferable, acrylic acid and methacrylic acid are more preferable, and methacrylic acid is even more preferable.

The proportion constituted by the acid group-containing monomer unit among all monomer units included in the water-soluble polymer is preferably 0.5 mass % or more, more preferably 1 mass % or more, and even more preferably 2 mass % or more, and is preferably 15 mass % or less, more preferably 10 mass % or less, and even more preferably 8 mass % or less. When the percentage content of the acid group-containing monomer unit is 0.5 mass % or more, binding capacity of the water-soluble polymer can be improved, and adhesiveness of a functional layer both before and after immersion in electrolysis solution can be improved. On the other hand, when the percentage content of the acid group-containing monomer unit is 15 mass % or less, the amount of water imported into a secondary battery can be reduced and reduction of cycle characteristics of the secondary battery can be inhibited.

[Production Method of Water-Soluble Polymer]

The water-soluble polymer can be produced, for example, by polymerizing a monomer composition containing the monomers set forth above, in an aqueous solvent such as water. In the polymerization, the percentage content of each monomer in the monomer composition can be set in accordance with the percentage content of each repeating unit (monomer unit) in the water-soluble polymer.

The polymerization method is not specifically limited, and any of solution polymerization, suspension polymerization, bulk polymerization, and emulsion polymerization may be used. Also, any polymerization reaction can be used, such as ionic polymerization, radical polymerization, or living radical polymerization.

Additives such as emulsifiers, dispersants, polymerization initiators, and polymerization aids used in the polymerization may be the same as typically used. Moreover, the amount of these additives may be the same as typically used. The polymerization conditions can be adjusted as appropriate depending on the polymerization method, the type of polymerization initiator, and so forth.

[Properties of Water-Soluble Polymer]

The degree of swelling of the water-soluble polymer in non-aqueous electrolysis solution is preferably a factor of 2 or more, more preferably a factor of 2.2 or more, and even more preferably a factor of 2.5 or more, and is preferably a factor of 5 or less, more preferably a factor of 4 or less, and even more preferably a factor of 3 or less. When the degree of swelling of the water-soluble polymer in non-aqueous electrolysis solution is a factor of 2 or more, the water-soluble polymer exhibits good compatibility with a non-aqueous electrolysis solution and the high specific surface area state of the water-soluble polymer in an aqueous composition for a functional layer can be maintained in the non-aqueous electrolysis solution. As a result, transition metal capturing ability of a functional layer can be further increased, and secondary battery cycle characteristics can be further improved. On the other hand, when the degree of swelling of the water-soluble polymer in non-aqueous electrolysis solution is a factor of 5 or less, strength of the water-soluble polymer can be ensured and adhesiveness of a functional layer after immersion in electrolysis solution can be increased.

The glass transition temperature of the water-soluble polymer is preferably −20° C. or higher, and more preferably −10° C. or higher, and is preferably 80° C. or lower, and more preferably 60° C. or lower. When the glass transition temperature of the water-soluble polymer is within any of the ranges set forth above, adhesiveness of a functional layer before immersion in electrolysis solution can be increased.

Note that the "glass transition temperature" of the water-soluble polymer is measured by a method described in the EXAMPLES section of the present specification.

<Production Method of Binder Composition for Non-Aqueous Secondary Battery>

No specific limitations are placed on the method by which the presently disclosed binder composition is produced. For example, in a situation in which the water-soluble polymer is produced in an aqueous medium and is obtained as an aqueous solution, the aqueous solution of the water-soluble polymer may be used, as produced, as the binder composition for a non-aqueous secondary battery, or other components may be added to the aqueous solution of the water-soluble polymer as necessary to produce the binder composition for a non-aqueous secondary battery. Note that the binder composition may also contain a solvent other than water. Production of a binder composition that contains other components can be performed simultaneously to production of a composition for a functional layer described below.

No specific limitations are placed on the other components so long as they do not have an excessively negative influence on battery reactions in a secondary battery in which the functional layer is used. Furthermore, one of such other components may be used, or two or more of such other components may be used.

Examples of these other components include a particulate polymer (also referred to as a "particulate binder"), a wetting agent, a leveling agent, and an electrolysis solution decomposition inhibitor.

The binder composition preferably contains a particulate polymer. Through combined use of the water-soluble polymer and the particulate polymer as a binder, a functional layer can be provided with flexibility, and adhesiveness of the functional layer both before and after immersion in electrolysis solution can be ensured. The particulate polymer is normally a polymer that is water-insoluble and is present in a particulate form in an aqueous medium. Furthermore, when a polymer is referred to as "water-insoluble" in the present disclosure, this means that when 0.5 g of the polymer is dissolved in 100 g of water at 25° C., insoluble content is 90 mass % or more.

Examples of the particulate polymer include, but are not specifically limited to, diene polymers such as a styrene-butadiene copolymer and an acrylonitrile-butadiene copolymer, fluorine-containing polymers such as polyvinylidene fluoride, and acrylic polymers. One of these polymers may be used individually, or two or more of these polymers may be used as a mixture.

No specific limitations are placed on the compounding ratio of the water-soluble polymer and the particulate polymer in the binder composition. For example, the amount of the particulate polymer that is contained in the binder composition per 100 parts by mass of the water-soluble polymer is preferably 10 parts by mass or more, more preferably 20 parts by mass or more, and even more preferably 30 parts by mass or more, and is preferably 100 parts by mass or less, more preferably 70 parts by mass or less, and even more preferably 50 parts by mass or less. When the binder composition contains the water-soluble polymer and the particulate polymer in a compounding ratio that is within any of the ranges set forth above, sufficient transition metal capturing ability of a functional layer can be ensured while increasing flexibility of the functional layer and increasing adhesiveness of the functional layer both before and after immersion in electrolysis solution. Accordingly, secondary battery cycle characteristics can also be further improved.

(Composition for Non-Aqueous Secondary Battery Functional Layer)

The presently disclosed composition for a functional layer is a slurry composition in which water serves as a dispersion medium and that contains at least the water-soluble polymer set forth above and non-conductive particles, and may further contain optional components such as a particulate polymer as necessary.

Since the presently disclosed composition for a functional layer is produced using the presently disclosed binder composition and contains the water-soluble polymer set forth above, the presently disclosed composition for a functional layer can be used to form a functional layer having high transition metal capturing ability. Moreover, as a result of the presently disclosed composition for a functional layer containing non-conductive particles, a functional layer obtained using the presently disclosed composition for a functional layer can favorably function as a porous membrane layer having excellent heat resistance and strength.

<Non-Conductive Particles>

The non-conductive particles are particles that maintain their shape without dissolving in water or a non-aqueous electrolysis solution of a secondary battery. The non-conductive particles are electrochemically stable and are, therefore, present stably in a functional layer in the environment of use of a secondary battery.

Various types of inorganic fine particles and organic fine particles can be used as the non-conductive particles.

Specifically, although both inorganic fine particles and organic fine particles other than the subsequently described particulate polymer (i.e., organic fine particles that do not exhibit binding capacity) can be used as the non-conductive particles, inorganic fine particles are normally used. The material of the non-conductive particles is preferably an electrochemically stable material that is present stably in the environment of use of a non-aqueous secondary battery. Examples of materials of the non-conductive particles that are preferable from the viewpoints set forth above include particles of oxides such as aluminum oxide (alumina), hydrous aluminum oxide (Boehmite), silicon oxide, magnesium oxide (magnesia), calcium oxide, titanium oxide (titania), $BaTiO_3$, ZrO, and alumina-silica composite oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of these types of non-conductive particles may be used individually, or two or more of these types of non-conductive particles may be used in combination. The non-conductive particles are preferably aluminum oxide (alumina) particles. The particle diameter of the non-conductive particles is not specifically limited and can be the same as that of conventionally used non-conductive particles.

The compounding ratio of the non-conductive particles and the water-soluble polymer in the composition for a functional layer is not specifically limited. For example, the amount of the water-soluble polymer that is contained in the composition for a functional layer per 100 parts by mass of the non-conductive particles is preferably 1 part by mass or more, more preferably 1.5 parts by mass or more, and even more preferably 2 parts by mass or more, and is preferably 10 parts by mass or less, more preferably 8 parts by mass or less, and even more preferably 6 parts by mass or less. When the amount of the water-soluble polymer that is contained in the composition for a functional layer is 1 part by mass or more per 100 parts by mass of the non-conductive particles, transition metal capturing ability of a functional layer is further increased, and secondary battery cycle characteristics are further improved. Moreover, heat contraction resistance of a battery member (particularly a separator) including the functional layer is improved. On the other hand, when the amount of the water-soluble polymer that is contained in the composition for a functional layer is 10 parts by mass or less per 100 parts by mass of the non-conductive particles, the Gurley value of the functional layer decreases and secondary battery rate characteristics are improved.

<Optional Components>

The composition for a functional layer may contain optional components in addition to the above-described water-soluble polymer and non-conductive particles. No specific limitations are placed on these optional components so long as they do not have an excessively negative influence on battery reactions in a secondary battery in which the functional layer is used. Furthermore, one of such optional components may be used, or two or more of such optional components may be used.

Examples of optional components that may be used include the "other components" previously described in the "Binder composition for non-aqueous secondary battery functional layer" section. In other words, optional components (other components) such as a particulate polymer may be used in production of the binder composition, or may be mixed with the binder composition in production of the composition for a functional layer after the binder composition has been produced.

In a case in which the composition for a functional layer contains a particulate polymer as an optional component, the compounding ratio of the non-conductive particles and the particulate polymer in the composition for a functional layer is not specifically limited. For example, the amount of the particulate polymer that is contained in the composition for a functional layer per 100 parts by mass of the non-conductive particles is preferably 1 part by mass or more, and is preferably 6 parts by mass or less, more preferably 5 parts by mass or less, and even more preferably 4 parts by mass or less. When the amount of the particulate polymer that is contained in the composition for a functional layer is 1 part by mass or more per 100 parts by mass of the non-conductive particles, flexibility of a functional layer and adhesiveness of the functional layer both before and after immersion in electrolysis solution can be increased. On the other hand, when the amount of the particulate polymer that is contained in the composition for a functional layer is 6 parts by mass or less per 100 parts by mass of the non-conductive particles, the Gurley value of the functional layer decreases and secondary battery rate characteristics are improved.

<Production Method of Composition for Non-Aqueous Secondary Battery Functional Layer>

No specific limitations are placed on the method by which the composition for a functional layer is produced, but the composition for a functional layer is normally produced through mixing of the binder composition for a non-aqueous secondary battery, the non-conductive particles, and, as necessary, water as a dispersion medium, and optional components. Although the mixing can be carried out by any method, the mixing is normally carried out using a disperser as a mixer to efficiently disperse the components.

The disperser is preferably a device that enables homogeneous dispersion and mixing of the components. Examples of devices that can be used include a ball mill, a sand mill, a pigment disperser, a grinding machine, an ultrasonic disperser, a homogenizer, and a planetary mixer. A high-level disperser that can apply a high level of dispersing shear, such as a bead mill, a roll mill, or a FILMIX, may also be used.

(Functional Layer for Non-Aqueous Secondary Battery)

The presently disclosed functional layer is a layer that is formed from the composition for a non-aqueous secondary battery functional layer set forth above. The presently disclosed functional layer can be formed, for example, by applying the above-described composition for a functional layer onto the surface of a suitable substrate to form an applied film, and then drying the applied film that is formed. In other words, the presently disclosed functional layer is composed of a dried product of the composition for a functional layer set forth above and normally contains the non-conductive particles, the water-soluble polymer, and, optionally, other components (optional components) such as a particulate polymer. In a case in which the above-described water-soluble polymer and/or the particulate polymer includes a crosslinkable monomer unit, the polymer including the crosslinkable monomer unit may be crosslinked in drying of the composition for a non-aqueous secondary battery functional layer, or may be crosslinked in heat treatment that is optionally performed after the drying (i.e., the functional layer for a non-aqueous secondary battery may contain a crosslinked product of the water-soluble polymer and/or the particulate polymer).

The ratio of components (exclusive of the dispersion medium, such as water) in the presently disclosed functional layer is normally the same as the ratio of the components in the composition for a functional layer set forth above. Moreover, the preferred ratio of components in the functional layer is the same as the preferred ratio of these components in the composition for a functional layer set forth above.

As a result of the presently disclosed functional layer being formed from the presently disclosed composition for a functional layer, the presently disclosed functional layer has high transition metal capturing ability and can favorably function as a porous membrane layer having excellent heat resistance and strength. Moreover, the presently disclosed functional layer can increase battery characteristics of a secondary battery, such as cycle characteristics.

<Substrate>

No specific limitations are placed on the substrate on which the functional layer is formed. For example, the substrate may be a separator substrate in a case in which the functional layer is used as a member that constitutes part of a separator and may be an electrode substrate obtained by forming an electrode mixed material layer on a current collector in a case in which the functional layer is used as a member that constitutes part of an electrode. No specific limitations are placed on the use of the functional layer formed on the substrate. For example, the functional layer may be formed on a separator substrate or the like and then used in this form as a battery member such as a separator. Alternatively, the functional layer may be formed on an electrode substrate and then used as an electrode. Further alternatively, the functional layer may be formed on a detachable substrate, peeled from the substrate, and then pasted onto another substrate to be used as a battery member.

However, it is preferable that a separator substrate or an electrode substrate is used as the substrate from a viewpoint of omitting a step of peeling a detachable substrate from the functional layer and raising battery member production efficiency.

[Separator Substrate]

The separator substrate is not specifically limited and may be a known separator substrate such as an organic separator substrate. The organic separator substrate is a porous member that is made from an organic material. The organic separator substrate may, for example, be a microporous membrane containing a polyolefin resin such as polyethylene or polypropylene, or an aromatic polyamide resin, and is preferably a microporous membrane made from polyethylene due to the excellent strength thereof. Although the organic separator substrate may be of any thickness, the thickness thereof is normally 0.5 µm or more, and preferably 5 µm or more, and is normally 40 µm or less, preferably 30 µm or less, and more preferably 20 µm or less.

[Electrode Substrate]

The electrode substrate (positive/negative electrode substrate) is not specifically limited and may, for example, be an electrode substrate obtained by forming an electrode mixed material layer on a current collector.

The current collector, an electrode active material (positive/negative electrode active material) and a binder for an electrode mixed material layer (binder for a positive/negative electrode mixed material layer) contained in the electrode mixed material layer, and the method by which the electrode mixed material layer is formed on the current collector may be known examples thereof such as described, for example, in JP 2013-145763 A. Moreover, the water-soluble polymer contained in the presently disclosed binder composition may be used as the binder for an electrode mixed material layer.

[Detachable Substrate]

The detachable substrate on which the functional layer may be formed is not specifically limited and may be a known detachable substrate.

<Formation Method of Functional Layer for Non-Aqueous Secondary Battery>

Examples of methods by which the functional layer may be formed on a substrate such as the separator substrate or the electrode substrate set forth above include:

(1) a method in which the composition for a functional layer is applied onto the surface of a separator substrate or an electrode substrate and is then dried;

(2) a method in which a separator substrate or an electrode substrate is immersed in the composition for a functional layer and is then dried; and (3) a method in which the composition for a functional layer is applied onto a detachable substrate and is dried to produce a functional layer that is then transferred onto the surface of a separator substrate or an electrode substrate.

Of these methods, the method described in (1) is particularly preferable since it allows the thickness of the functional layer to be easily controlled. More specifically, the method described in (1) includes a step of applying the composition for a functional layer onto a separator substrate or an electrode substrate (application step) and a step of drying the composition for a functional layer that has been applied onto the separator substrate or the electrode substrate to form a functional layer (functional layer formation step).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The composition for a functional layer on the substrate may be dried by any commonly known method in the functional layer formation step, without any specific limitations. For example, the drying method may be drying by warm, hot, or low-humidity air; drying in a vacuum; or drying by irradiation with infrared light or electron beams. Although no specific limitations are placed on the drying conditions, the drying temperature is preferably 50° C. to 100° C., and the drying time is preferably 5 minutes to 30 minutes.

The thickness of the functional layer formed on the substrate can be adjusted as appropriate.

(Non-Aqueous Secondary Battery)

The presently disclosed non-aqueous secondary battery includes the presently disclosed functional layer for a non-aqueous secondary battery set forth above. More specifically, the presently disclosed non-aqueous secondary battery includes a positive electrode, a negative electrode, a separator, and an electrolysis solution, wherein at least one battery member among the positive electrode, the negative electrode, and the separator includes the functional layer for a non-aqueous secondary battery set forth above.

Through inclusion of the presently disclosed functional layer for a non-aqueous secondary battery, the presently disclosed non-aqueous secondary battery has excellent battery characteristics such as cycle characteristics.

<Positive Electrode, Negative Electrode, and Separator>

At least one of the positive electrode, the negative electrode, and the separator used in the presently disclosed secondary battery includes a functional layer. Specifically, an electrode produced by forming an electrode mixed material layer on a current collector to form an electrode substrate and then providing a functional layer on the electrode substrate may be used as a functional layer-containing positive electrode or a functional layer-containing negative electrode. Moreover, a separator produced by providing a functional layer on a separator substrate may be used as a functional layer-containing separator. The electrode substrate and the separator substrate can be any of the examples previously described in the "Substrate" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolysis Solution>

The electrolysis solution is normally an organic electrolysis solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution may be any organic solvent in which the supporting electrolyte dissolves. Examples of suitable organic solvents that can be used in the case of a lithium ion secondary battery include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolysis solution may be adjusted as appropriate. Furthermore, known additives may be added to the electrolysis solution.

<Production Method of Non-Aqueous Secondary Battery>

The non-aqueous secondary battery can be produced by, for example, stacking the positive electrode and the negative electrode with the separator in-between, performing rolling, folding, or the like of the resultant stack as necessary to place the stack in a battery container, injecting the electrolysis solution into the battery container, and sealing the battery container. At least one of the positive electrode, the negative electrode, and the separator is a functional layer-containing member. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion constituted by a repeating unit (monomer unit) that is formed through polymerization of a given monomer in the polymer is normally, unless otherwise specified, the same as the ratio (charging ratio) of the given monomer among all monomers used in polymerization of the polymer.

In the examples and comparative examples, the following methods were used to measure and evaluate the degree of swelling in non-aqueous electrolysis solution and glass transition temperature of a water-soluble polymer, the adhesiveness of a functional layer before and after immersion in electrolysis solution, the transition metal capturing ability of a functional layer, the heat contraction resistance of a separator, and the cycle characteristics of a lithium ion secondary battery.

<Degree of Swelling in Non-Aqueous Electrolysis Solution>

An aqueous solution of a water-soluble polymer was placed in an aluminum dish of 5 cm in diameter and was dried for 2 days in a constant temperature and humidity chamber (25° C., 50% humidity) to obtain a film of 1 mm in thickness. The film was cut out to 1.5 cm×1.5 cm in size to obtain a binder film and the weight M0 of this binder film was measured. Thereafter, the obtained binder film was immersed in a non-aqueous electrolysis solution (solvent: EC/DEC/vinylene carbonate (VC)=68.5/30/1.5 (volume ratio); electrolyte: $LiPF_6$ of 1 M in concentration) for 72 hours at 60° C. After immersion, non-aqueous electrolysis solution was wiped from the surface of the binder film and the weight M1 of the binder film was measured. The degree of swelling in the non-aqueous electrolysis solution was calculated by the following formula.

Degree of swelling in non-aqueous electrolysis solution=$M1/M0$

<Glass Transition Temperature>

An aqueous solution of a water-soluble polymer was dried for 3 days in an environment of 50% humidity and 23° C. to 25° C. to obtain a film of 1 mm in thickness. This film was dried for 1 hour in a hot air oven at 120° C. The dried film was used as a sample for measuring the glass transition temperature (° C.) in accordance with JIS K7121 using a differential scanning calorimeter (DSC6220 produced by SIT Nanotechnology Inc.) with a measurement temperature of −100° C. to 180° C. and a heating rate of 5° C./minute.

<Adhesiveness Before Immersion in Electrolysis Solution>

A separator (separator including a functional layer on a separator substrate) was cut out as a rectangular shape of 10 mm in width by 100 mm in length to obtain a specimen. The specimen was placed with the surface of the functional layer underneath and cellophane tape was attached to the surface of the functional layer. Tape prescribed by JIS Z1522 was used as the cellophane tape. The cellophane tape was fixed to a horizontal test bed. Next, one end of the separator was pulled in a direction at 180° with a pulling speed of 10 mm/minute to peel off the separator, and the stress during this peeling was measured. This measurement was performed three times and an average value was determined as the peel strength P1, which was evaluated according to the following standard. A larger peel strength P1 indicates better adhesiveness between the functional layer and the separator substrate before immersion in electrolysis solution.

A: Peel strength P1 of 180 N/m or more
B: Peel strength P1 of at least 140 N/m and less than 180 N/m
C: Peel strength P1 of at least 100 N/m and less than 140 N/m
D: Peel strength P1 of less than 100 N/m <Adhesiveness after Immersion in Electrolysis Solution>

A separator (separator including a functional layer on a separator substrate) was cut out as a rectangular shape of 10 mm in width by 100 mm in length to obtain a specimen. The specimen was immersed in an electrolysis solution (solvent: EC/DEC/VC (volume mixing ratio)=68.5/30/1.5; electrolyte: $LiPF_6$ of 1 M in concentration) for 180 minutes. Thereafter, the specimen was removed from the electrolysis solution and electrolysis solution attached to the surface of the functional layer was wiped off. The specimen was then placed with the surface of the functional layer underneath and cellophane tape was attached to the surface of the functional layer. Tape prescribed by JIS Z1522 was used as the cellophane tape. The cellophane tape was fixed to a horizontal test bed. Next, one end of the separator was pulled vertically upward at a pulling speed of 50 mm/minute to peel off the separator, and the stress during this peeling was measured. This measurement was performed three times and an average value was determined as the peel strength P2, which was evaluated according to the following standard. A larger peel strength P2 indicates better adhesiveness between the functional layer and the separator substrate after immersion in electrolysis solution.

A: Peel strength P2 of 9.0 N/m or more
B: Peel strength P2 of at least 8.0 N/m and less than 9.0 N/m
C: Peel strength P2 of at least 6.0 N/m and less than 8.0 N/m
D: Peel strength P2 of less than 6.0 N/m <Transition Metal Capturing Ability>

A separator (separator including a functional layer on a separator substrate) was cut out to a size of 100 cm² in area to obtain a specimen, and the weight of this specimen was measured. Next, an electrolysis solution was obtained by dissolving $LiPF_6$ as a supporting electrolyte in a solvent (EMC:EC=70:30 (mass ratio)) in a concentration of 1 mol/L. Cobalt chloride (anhydrous) ($CoCl_2$), nickel chloride (anhydrous) ($NiCl_2$), and manganese chloride (anhydrous) ($MnCl_2$) were dissolved in this electrolysis solution such that the concentration of each metal ion was 20 mass ppm to prepare an electrolysis solution for measurement. Thereafter, 10 g of the electrolysis solution for measurement was added into a glass vessel containing the specimen, and the specimen was left in an immersed state in the electrolysis solution for measurement for 5 days at 25° C. Subsequently, the specimen was taken out of the glass container and was sufficiently washed with DEC. DEC attached to the surface of the specimen was sufficiently wiped off, and then the weight of the specimen was measured. Thereafter, the specimen was placed in a Teflon® (Teflon is a registered trademark in Japan, other countries, or both) beaker, and sulfuric acid and nitric acid (sulfuric acid/nitric acid=0.1:2 (volume ratio)) were added thereto. The beaker was heated on a hot plate to perform concentrating until carbonization of the specimen occurred. Further nitric acid and perchloric acid (nitric acid:perchloric acid=2:0.2 (volume ratio)) were added, followed by perchloric acid and hydrofluoric acid (perchloric acid:hydrofluoric acid=2:0.2 (volume ratio)), and concentrating was performed until white smoke was given off. Next, nitric acid and ultrapure water (nitric acid:ultrapure water=0.5:10 (volume ratio)) were added to the beaker and the contents thereof were heated. The contents of the beaker were left to cool and were then adjusted to a fixed volume to obtain a fixed volume solution. The amounts of cobalt, nickel, and manganese in this fixed volume solution were measured using an ICP mass spectrometer (ELAN DRS II produced by PerkinElmer Inc.). The total amount of cobalt, nickel, and manganese in the fixed volume solution was divided by the weight of the specimen to calculate the transition metal concentration (mass ppm) in the specimen. The transition metal concentration was evaluated according to the following standard. A higher transition metal concentration indicates a higher transition metal capturing ability per unit mass of the functional layer.

A: Transition metal concentration of 2,500 mass ppm or more
B: Transition metal concentration of at least 1,500 mass ppm and less than 2,500 mass ppm
C: Transition metal concentration of at least 500 mass ppm and less than 1,500 mass ppm
D: Transition metal concentration of less than 500 mass ppm <Heat Contraction Resistance>

A separator (separator including a functional layer on a separator substrate) was cut out as a square with a side length of 12 cm, and a square having a side length of 10 cm was drawn inside the cut-out square to obtain a specimen. The specimen was left for 1 hour in a 150° C. thermostatic tank and the heat contraction rate thereof was determined by calculating the change in area of the square drawn inside the specimen (={(area of square before being left−area of square after being left)/area of square before being left}×100%). The heat contraction rate was evaluated according to the following standard. A smaller heat contraction rate indicates that the functional layer-containing separator has better heat contraction resistance.

A: Heat contraction rate of less than 5%
B: Heat contraction rate of at least 5% and less than 10%
C: Heat contraction rate of at least 10% and less than 20%
D: Heat contraction rate of 20% or more <Cycle Characteristics>

A produced lithium ion secondary battery was left for 24 hours at an ambient temperature of 25° C. Thereafter, the lithium ion secondary battery was subjected to a charge/discharge operation at an ambient temperature of 25° C. in which the lithium ion secondary battery was charged to 4.4 V at a charge rate of 0.1C and discharged to 2.75 V at a discharge rate of 0.1C, and the initial capacity C0 of the lithium ion secondary battery was measured. The lithium ion secondary battery was then repeatedly subjected to the same charge/discharge operation at an ambient temperature of 60° C., and the capacity C1 of the lithium ion secondary battery after 1,000 cycles was measured.

The capacity retention rate ΔC (=(C1/C0)×100%) with respect to before and after this cycling was calculated and was evaluated according to the following standard. A larger capacity retention rate ΔC indicates better secondary battery high-temperature cycle characteristics and longer secondary battery life.

A: Capacity retention rate ΔC of 85% or more
B: Capacity retention rate ΔC of at least 80% and less than 85%
C: Capacity retention rate ΔC of at least 75% and less than 80%
D: Capacity retention rate ΔC of less than 75%

Example 1

<Production of Binder Composition for Non-Aqueous Secondary Battery>

A 5 MPa pressure vessel equipped with a stirrer was charged with 30 parts of lithium styrenesulfonate as a sulfonate group-containing monomer, 35 parts of acrylonitrile as a (meth)acrylonitrile monomer, 30 parts of butyl acrylate as a (meth)acrylic acid ester monomer, 5 parts of methacrylic acid as an acid group-containing monomer, 1.0 parts of ammonium polyoxyalkylene alkenyl ether sulfate as a reactive surfactant, 400 parts of deionized water, and 1.0 parts of potassium persulfate as a polymerization initiator. The contents of the pressure vessel were sufficiently stirred and were then heated to 65° C. to initiate polymerization. The reaction was terminated by cooling at the point at which the polymerization conversion rate reached 96% to yield a binder composition for a non-aqueous secondary battery (aqueous solution of water-soluble polymer). This binder composition was used in measurement of the degree of swelling in non-aqueous electrolysis solution and glass transition temperature of the water-soluble polymer. The results are shown in Table 1.

<Production of Water Dispersion of Particulate Polymer>

A reaction vessel equipped with a stirrer was charged with 70 parts of deionized water, 0.15 parts of sodium lauryl sulfate (produced by Kao Corporation, product name: EMAL 2F) as an emulsifier, and 0.5 parts of ammonium persulfate. The gas phase of the reaction vessel was purged with nitrogen gas and the contents of the reaction vessel were heated to 60° C.

A monomer mixture was prepared in a separate vessel by mixing 50 parts of deionized water, 0.5 parts of sodium dodecylbenzenesulfonate as a dispersant, 94 parts of butyl acrylate, 2 parts of acrylonitrile, 2 parts of methacrylic acid, 1 part of N-methylolacrylamide, and 1 part of acrylamide. The monomer mixture was continuously added to the reaction vessel over 4 hours while carrying out polymerization. The reaction was carried out at 60° C. during the addition. Once the addition was completed, stirring was carried out for a further 3 hours at 70° C. to complete the reaction and yield a water dispersion containing an acrylic polymer that was a particulate polymer. The glass transition temperature of the acrylic polymer as measured in the same way as the glass transition temperature of the water-soluble polymer was −40° C.

<Production of Composition for Non-Aqueous Secondary Battery Functional Layer>

A composition for a functional layer was produced by mixing 5 parts by solid content equivalents of the water-soluble polymer, 2 parts by solid content equivalents of the particulate polymer, and 0.2 parts of a polyethylene glycol-type surfactant (SAN NOPCO® (SAN NOPCO is a registered trademark in Japan, other countries, or both) SN WET 366 produced by San Nopco Limited) with 100 parts of alumina filler (LS256 produced by Nippon Light Metal Co., Ltd.) as non-conductive particles. Through this mixing, a binder composition containing the water-soluble polymer and the particulate polymer was produced. In other words, a binder composition containing the water-soluble polymer and the particulate polymer was contained in the resultant composition for a functional layer.

<Production of Functional Layer and Functional Layer-Containing Separator>

An organic separator substrate (produced by Celgard, LLC.; thickness: 16 μm) formed by a porous substrate made from polyethylene was prepared as a separator substrate. The composition for a functional layer described above was applied onto this separator substrate and was dried for 10 minutes at 60° C. As a result, a separator including a functional layer of 2 μm in thickness on the separator substrate was obtained. This separator was used in evaluation of adhesiveness of the functional layer before and after immersion in electrolysis solution, transition metal capturing ability of the functional layer, and heat contraction resistance of the separator. The results are shown in Table 1.

<Production of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were then heated to 50° C. to initiate polymerization. The reaction was terminated by cooling at the point at which the polymerization conversion rate reached 96% to yield a mixture containing a particulate binder (SBR) for a negative electrode mixed material layer. The mixture containing the particulate binder was adjusted to pH 8 through addition of 5% sodium hydroxide aqueous solution and then unreacted monomers were removed by distillation under heating and reduced pressure. Thereafter, the mixture was cooled to 30° C. or lower to obtain a water dispersion containing the target particulate binder.

Next, 100 parts of artificial graphite (volume average particle diameter D50: 15.6 μm) as a negative electrode active material, 1 part by solid content equivalents of a 2% aqueous solution of a sodium salt of carboxymethyl cellulose (MAC350HC produced by Nippon Paper Industries Co., Ltd.) as a thickener, and deionized water were mixed, were adjusted to a solid content concentration of 68%, and were subsequently mixed for 60 minutes at 25° C. Next, deionized water was used to adjust the solid content concentration to 62% and further mixing was performed for 15 minutes at 25° C. Thereafter, 1.5 parts by solid content equivalents of the water dispersion containing the particulate binder described above and deionized water were added to the resultant mixed liquid, which was adjusted to a final solid content concentration of 52% and was then further mixed for 10 minutes. The resultant mixed liquid was subjected to a defoaming process under reduced pressure to yield a slurry composition for a negative electrode having good fluidity.

The slurry composition for a negative electrode obtained as described above was applied onto copper foil (current collector) of 20 μm in thickness using a comma coater such as to have a thickness of approximately 150 μm after drying. The slurry composition for a negative electrode was then dried to obtain a negative electrode web by conveying the copper foil inside of a 60° C. oven for 2 minutes at a speed of 0.5 m/minute. The resultant negative electrode web was subsequently rolled by roll pressing to obtain a negative electrode including a negative electrode mixed material layer of 80 μm in thickness.

<Production of Positive Electrode>

N-methylpyrrolidone was mixed with 100 parts of $LiCoO_2$ (volume average particle diameter D50: 12 μm) as a positive electrode active material, 2 parts of acetylene black (HS-100 produced by Denki Kagaku Kogyo Kabushiki Kaisha) as a conductive material, and 2 parts by solid content equivalents of polyvinylidene fluoride (#7208 produced by Kureha Corporation) as a binder for a positive electrode mixed material layer such as to adjust the total solid content concentration thereof to 70%. These materials were mixed using a planetary mixer to produce a slurry composition for a positive electrode.

The slurry composition for a positive electrode obtained as described above was applied onto aluminum foil (current collector) of 20 μm in thickness using a comma coater such as to have a thickness of approximately 150 μm after drying. The slurry composition for a positive electrode was dried to obtain a positive electrode web by conveying the aluminum foil inside of a 60° C. oven for 2 minutes at a speed of 0.5 m/minute, and then performing heat treatment for 2 minutes at 120° C. The resultant positive electrode web was subsequently rolled by roll pressing to obtain a positive electrode including a positive electrode mixed material layer of 80 μm in thickness.

<Production of Lithium Ion Secondary Battery>

The pressed positive electrode obtained as described above was cut out to 49 cm×5 cm in size and was placed with the surface at the positive electrode mixed material layer side thereof on top. A separator (separator including a functional layer at one side thereof) that had been cut out to 120 cm×5.5 cm in size was placed such that the surface at the positive electrode mixed material layer side of the positive electrode and the functional layer of the separator faced one another and such that the positive electrode was positioned at the longitudinal direction left-hand side of the separator. The pressed negative electrode obtained as described above was cut out to 50 cm×5.2 cm in size and was positioned on the separator such that the surface at the negative electrode mixed material layer side of the negative electrode and the organic separator substrate of the separator faced one another and such that the negative electrode was positioned at the longitudinal direction right-hand side of the separator. A winding machine was used to wind the resultant product with the longitudinal direction center of the separator at the center to obtain a roll. The roll was pressed into a flat form at 60° C. and 0.5 MPa, and was subsequently packed into an aluminum packing case used as a battery case. An electrolysis solution (solvent: EC/DEC/VC (volume ratio)=68.5/30/1.5; electrolyte: $LiPF_6$ of 1 M in concentration) was injected into the aluminum packing case such that no air remained. The aluminum packing case was then closed by heat sealing at 150° C. to tightly seal an opening of the aluminum packing case and thereby produce a wound lithium ion secondary battery having a discharge capacity of 1,000 mAh as a non-aqueous secondary battery.

Cycling of the resultant secondary battery was evaluated. The results are shown in Table 1.

Examples 2 to 7

A binder composition, a composition for a functional layer, a functional layer, a functional layer-containing separator, a negative electrode, a positive electrode, and a lithium ion secondary battery were produced in the same way as in Example 1 with the exception that the types and proportions of monomers used in production of the binder composition for a non-aqueous secondary battery were changed as shown in Table 1. Moreover, each evaluation was performed in the same way as in Example 1. The results are shown in Table 1. Note that sodium styrenesulfonate was used as a sulfonate group-containing monomer in Example 4.

Comparative Examples 1 to 4

A binder composition, a composition for a functional layer, a functional layer, a functional layer-containing separator, a negative electrode, a positive electrode, and a lithium ion secondary battery were produced in the same way as in Example 1 with the exception that the types and proportions of monomers used in production of the binder composition for a non-aqueous secondary battery were changed as shown in Table 1. Moreover, each evaluation was performed in the same way as in Example 1. The results are shown in Table 1. Note that in Comparative Examples 3 and 4, a water-insoluble polymer was obtained in production of the binder composition for a non-aqueous secondary battery, rather than a water-soluble polymer. Moreover, 2-ethylhexyl acrylate was used as a (meth)acrylic acid ester monomer in Comparative Example 4.

In Table 1, shown below:
"LiSS" indicates lithium styrenesulfonate;
"NaSS" indicates sodium styrenesulfonate;
"AN" indicates acrylonitrile;
"BA" indicates butyl acrylate;
"2-EHA" indicates 2-ethylhexyl acrylate;
"MAA" indicates methacrylic acid; and
"ACL" indicates acrylic polymer.

TABLE 1

| | | | | Example 1 | Example 2 | Example 3 | Example 4 | Example 5 | Example 6 | Example 7 |
|---|---|---|---|---|---|---|---|---|---|---|
| Composition for functional layer | Non-conductive particles | Type | | Alumina | Alumina | Alumina | Alumina | Alumina | Alumina | Alumina |
| | | Amount [parts by mass] | | 100 | 100 | 100 | 100 | 100 | 100 | 100 |
| | Water-soluble polymer, etc. | Water-soluble or water-insoluble | | Water-soluble | Water-soluble | Water-soluble | Water-soluble | Water-soluble | Water-soluble | Water-soluble |
| | | Composition | Sulfonate group-containing monomer unit | Type | LiSS | LiSS | LiSS | NaSS | LiSS | LiSS | LiSS |
| | | | | Proportion [mass %] | 30 | 12 | 43 | 30 | 30 | 15 | 35 |
| | | | (Meth)actylonitrile monomer unit | Type | AN | AN | AN | AN | AN | AN | AN |
| | | | | Proportion [mass %] | 35 | 35 | 35 | 35 | 22 | 20 | 35 |
| | | | (Meth)acrylic acid ester monomer unit | Type | BA | BA | BA | BA | BA | BA | BA |
| | | | | Proportion [mass %] | 30 | 48 | 17 | 30 | 43 | 60 | 30 |
| | | | Acid group-containing monomer unit | Type | MAA | MAA | MAA | MAA | MAA | MAA | — |
| | | | | Proportion [mass %] | 5 | 5 | 5 | 5 | 5 | 5 | — |
| | | Glass transition temperature [° C.] | | 48 | 16 | 76 | 48 | 22 | −4 | 41 |
| | | Degree of swelling in non-aqueous electrolysis solution [factor] | | 2.8 | 3.5 | 2.2 | 2.8 | 2.4 | 4.5 | 2.8 |
| | | Amount [parts by mass] | | 5 | 5 | 5 | 5 | 5 | 5 | 5 |
| | Particulate polymer | Type | | ACL | ACL | ACL | ACL | ACL | ACL | ACL |
| | | Amount [parts by mass] | | 2 | 2 | 2 | 2 | 2 | 2 | 2 |
| Adhesiveness (before electrolysis solution immersion) | | | | A | A | B | A | A | A | A |
| Heat contraction resistance | | | | A | A | A | A | B | B | A |
| Adhesiveness (after electrolysis solution immersion) | | | | A | B | A | A | A | B | A |
| Transition metal capturing ability | | | | A | B | B | A | B | B | A |
| Cycle characteristics | | | | A | B | B | B | B | B | A |

| | | | | Comparative Example 1 | Comparative Example 2 | Comparative Example 3 | Comparative Example 4 |
|---|---|---|---|---|---|---|---|
| Composition for functional layer | Non-conductive particles | Type | | Alumina | Alumina | Alumina | Alumina |
| | | Amount [parts by mass] | | 100 | 100 | 100 | 100 |
| | Water-soluble polymer, etc. | Water-soluble or water-insoluble | | Water-soluble | Water-soluble | Water-insoluble | Water-insoluble |
| | | Composition | Sulfonate group-containing monomer unit | Type | LiSS | LiSS | LiSS | LiSS |
| | | | | Proportion [mass %] | 7 | 53 | 30 | 30 |

TABLE 1-continued

|  |  |  |  |  |  |  |
|---|---|---|---|---|---|---|
|  | (Meth)actylonitrile mononun unit | Type | AN | AN | AN | AN |
|  |  | Proportion [mass %] | 35 | 35 | 15 | 35 |
|  | (Meth)acrylic acid ester mononer unit | Type | BA | BA | BA | 2-EHA |
|  |  | Proportion [mass %] | 53 | 7 | 50 | 30 |
|  | Acid group-containing mononer unit | Type | MAA | MAA | MAA | MAA |
|  |  | Proportion [mass %] | 5 | 5 | 5 | 5 |
|  | Glass transition temperature [° C.] |  | 9 | 101 | 10 | 41 |
|  | Degree of swelling in non-aqueous electrolysis solution [factor] |  | 5.2 | 1.9 | 2.2 | 2 |
|  | Amount [parts by mass] |  | 5 | 5 | 5 | 5 |
| Particulate polymer | Type |  | ACL | ACL | ACL | ACL |
|  | Amount [parts by mass] |  | 2 | 2 | 2 | 2 |
| Adhesiveness (before electrolysis solution immersion) |  |  | A | D | A | A |
| Heat contraction resistance |  |  | A | A | D | A |
| Adhesiveness (after electrolysis solution immersion) |  |  | D | A | A | A |
| Transition metal capturing ability |  |  | D | C | C | D |
| Cycle characteristics |  |  | D | C | C | D |

Examples 1 to 7 and Comparative Examples 1 to 4 in Table 1 demonstrate that when a water-soluble polymer including a sulfonate group-containing monomer unit in a proportion of at least 10 mass % and not more than 50 mass % and a (meth)acrylonitrile monomer unit in a proportion of 20 mass % or more is used as a binder, it is possible to form a functional layer that has excellent transition metal capturing ability and enables a secondary battery to display excellent cycle characteristics. It can also be seen that a functional layer obtained using such a water-soluble polymer has excellent adhesiveness both before and after immersion in electrolysis solution and that a separator including such a functional layer has excellent heat contraction resistance.

Moreover, Examples 1 to 7 in Table 1 demonstrate that transition metal capturing ability of the functional layer, adhesiveness of the functional layer both before and after immersion in electrolysis solution, heat contraction resistance of the separator, and cycle characteristics of the secondary battery can be further improved by altering the types and proportions of monomers used in production of the binder composition for a non-aqueous secondary battery (aqueous solution of water-soluble polymer).

INDUSTRIAL APPLICABILITY

According to this disclosure, it is possible to provide a binder composition for a non-aqueous secondary battery that enables formation of a functional layer and an electrode mixed material layer having high transition metal capturing ability.

Moreover, according to this disclosure, it is possible to provide a composition for a non-aqueous secondary battery functional layer that enables formation of a functional layer having high transition metal capturing ability.

Furthermore, according to this disclosure, it is possible to provide a functional layer for a non-aqueous secondary battery having high transition metal capturing ability and a non-aqueous secondary battery that includes this functional layer for a non-aqueous secondary battery and has excellent battery characteristics such as cycle characteristics.

The invention claimed is:

1. A binder composition for a non-aqueous secondary battery comprising a water-soluble polymer and water, wherein
the water-soluble polymer includes a sulfonate group-containing monomer unit in a proportion of at least 10 mass % and not more than 50 mass % and a (meth)acrylonitrile monomer unit in a proportion of 20 mass % or more and 50 mass % or less.

2. The binder composition for a non-aqueous secondary battery according to claim 1, wherein
the water-soluble polymer has a degree of swelling in non-aqueous electrolysis solution of at least a factor of 2 and not more than a factor of 5.

3. A binder composition for a non-aqueous secondary battery comprising a water-soluble polymer, a particulate polymer and water, wherein
the water-soluble polymer includes a sulfonate group-containing monomer unit in a proportion of at least 10 mass % and not more than 50 mass % and a (meth)acrylonitrile monomer unit in a proportion of 20 mass % or more.

4. A composition for a non-aqueous secondary battery functional layer comprising:
a binder composition for a non-aqueous secondary battery; and
non-conductive particles, wherein
the binder composition for a non-aqueous secondary battery comprises a water-soluble polymer and water, wherein
the water-soluble polymer includes a sulfonate group-containing monomer unit in a proportion of at least 10 mass % and not more than 50 mass % and a (meth)acrylonitrile monomer unit in a proportion of 20 mass % or more.

5. The composition for a non-aqueous secondary battery functional layer according to claim 4, wherein
the water-soluble polymer is contained in a proportion of at least 1 part by mass and not more than 10 parts by mass per 100 parts by mass of the non-conductive particles.

6. A functional layer for a non-aqueous secondary battery formed using a composition for a non-aqueous secondary battery functional layer comprising:
a binder composition for a non-aqueous secondary battery; and
non-conductive particles, wherein
the binder composition for a non-aqueous secondary battery comprising a water-soluble polymer and water, the water-soluble polymer includes a sulfonate group-containing monomer unit in a proportion of at least 10 mass % and not more than 50 mass % and a (meth)acrylonitrile monomer unit in a proportion of 20 mass % or more, and the water-soluble polymer is contained in a proportion of at least 1 part by mass and not more than 10 parts by mass per 100 parts by mass of the non-conductive particles.

7. A non-aqueous secondary battery comprising the functional layer for a non-aqueous secondary battery according to claim 6.

\* \* \* \* \*